(12) United States Patent
Bayardo et al.

(10) Patent No.: US 7,877,484 B2
(45) Date of Patent: Jan. 25, 2011

(54) SYSTEM AND METHOD FOR BULK PROCESSING OF SEMI-STRUCTURED RESULT STREAMS FROM MULTIPLE RESOURCES

(75) Inventors: Roberto Javier Bayardo, Morgan Hill, CA (US); Daniel F. Gruhl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 10/830,839

(22) Filed: Apr. 23, 2004

(65) Prior Publication Data

US 2005/0251575 A1 Nov. 10, 2005

(51) Int. Cl.
G06F 15/16 (2006.01)
H04J 12/28 (2006.01)
H04J 3/26 (2006.01)

(52) U.S. Cl. .................. 709/227; 709/228; 709/229; 709/207; 370/431; 370/432

(58) Field of Classification Search ................ 709/227, 709/228, 229, 207; 370/431, 432
See application file for complete search history.

(56) References Cited

U.S. PATENT DOCUMENTS

| | | | | |
|---|---|---|---|---|
| 5,046,181 A | * | 9/1991 | Higuchi et al. | 370/360 |
| 5,630,067 A | * | 5/1997 | Kindell et al. | 709/231 |
| 5,761,417 A | * | 6/1998 | Henley et al. | 709/231 |
| 5,946,487 A | * | 8/1999 | Dangelo | 717/148 |
| 5,949,977 A | * | 9/1999 | Hernandez | 709/229 |
| 6,055,564 A | * | 4/2000 | Phaal | 709/207 |
| 6,105,053 A | * | 8/2000 | Kimmel et al. | 718/105 |
| 6,182,108 B1 | * | 1/2001 | Williams et al. | 718/102 |
| 6,477,562 B2 | * | 11/2002 | Nemirovsky et al. | 718/108 |
| 6,587,865 B1 | * | 7/2003 | Kimbrel et al. | 718/104 |
| 6,606,660 B1 | * | 8/2003 | Bowman-Amuah | 709/227 |

(Continued)

FOREIGN PATENT DOCUMENTS

CN 1690969 A 11/2005

(Continued)

OTHER PUBLICATIONS

International Search Report dated Mar. 26, 2009 for PCT/CN2008/073482.

*Primary Examiner*—William C Vaughn, Jr.
*Assistant Examiner*—Umar Cheema
(74) *Attorney, Agent, or Firm*—Jon A. Gibons; Fleit Gibbons Gutman Bongini & Bianco PL (57) ABSTRACT

A system and associated method for bulk processing of semi-structured results streams from many different resources ingest bytes, parse as many bytes as practical, and return to process additional bytes. The system processes network packets as they arrive from a computing resource, creating intermediate results. The intermediate results are held in a stack until sufficient information is accumulated. The system then merges the intermediate results to form a single document model. As network packets at one connection are consumed by the system, the system can select another connection at which packets are waiting for processing. The processing of a result at a connection can be interrupted while the system processes the results at another connection. In this manner, the system is able to utilize one thread to process many incoming results in parallel.

33 Claims, 8 Drawing Sheets

U.S. PATENT DOCUMENTS

| | | | |
|---|---|---|---|
| 6,618,378 B1 * | 9/2003 | Giroux et al. | 370/395.1 |
| 6,633,897 B1 * | 10/2003 | Browning et al. | 718/103 |
| 6,842,906 B1 * | 1/2005 | Bowman-Amuah | 719/330 |
| 2002/0112224 A1 * | 8/2002 | Cox | 717/100 |
| 2003/0072260 A1 * | 4/2003 | Janoska et al. | 370/229 |
| 2007/0074215 A1 | 3/2007 | Bethea et al. | |

FOREIGN PATENT DOCUMENTS

| | | |
|---|---|---|
| CN | 101197827 A | 6/2008 |
| WO | WO2007075234 A1 | 7/2007 |

* cited by examiner

SYSTEM AND METHOD FOR BULK PROCESSING OF SEMI-STRUCTURED RESULT STREAMS FROM MULTIPLE RESOURCES

FIELD OF THE INVENTION

The present invention generally relates to a system and a method for processing incoming or outgoing streams of data from a variety of resources and particularly to computing resources such as databases, servers, and like resources. More specifically, the present invention pertains to the use of a small number of threads to process several parallel incoming streams of semi-structured data in an interleaved fashion.

BACKGROUND OF THE INVENTION

A client program or user utilizing a large distributed computing system typically issues queries, search requests, data selection requests, and so forth, and collects results from a large number of servers in the distributed computing system. The large distributed computing system may be any environment that comprises data that is horizontally partitioned across many servers. A continuing effort has been made to make the process of collecting the information from the servers as efficient as possible with regards to both time and resources. The need for efficient collection of information from large distributed computing systems has become more critical as more systems adopt a web services approach to interfacing with clients.

Figure 6:
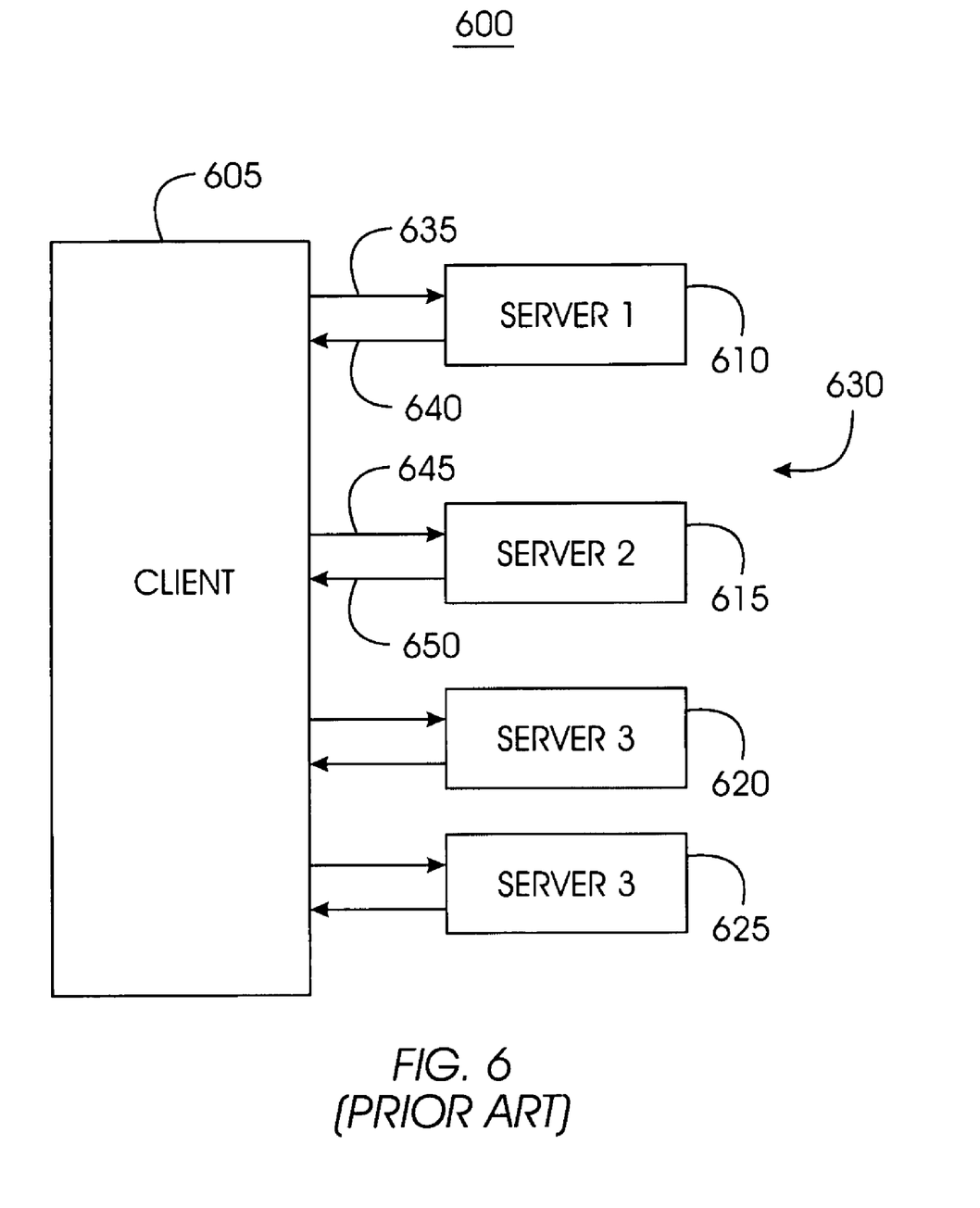
FIG. 6 is a diagram illustrating a conventional method for sequential processing of a query result.

One conventional approach to issuing queries and collecting results is a sequential processing approach 600, illustrated by the diagram of FIG. 6. A client 605 sequentially issues a query to and receives a result from server 1, 610, server 2, 615, server 3, 620, and server 4, 625 (collectively referenced as servers 630). For example, client 605 issues a query 635 to server 1, 610, and receives a result 640. Client 605 then issues a query 645 to server 2, 615, and receives a result 650, etc. This sequential process is repeated until all the queries have been issued and all the results returned. Although this technology has proven to be useful, it would be desirable to present additional improvements.

The sequential processing approach 600 has the advantage of requiring a single thread to process the results. Utilizing a single thread is efficient with respect to resources, but not time. The sequential processing approach 600 is relatively slow; a delay by one of the servers 630 delays the overall response to the query. Each of the servers 630 may take a reasonable amount of time such as, for example, 10 ms to respond to the query. However, for a large number of servers 630, the overall response time to the query becomes unacceptably slow. The time required to respond to the query becomes the sum of the time required for each of the remote procedure calls.

Figure 7:
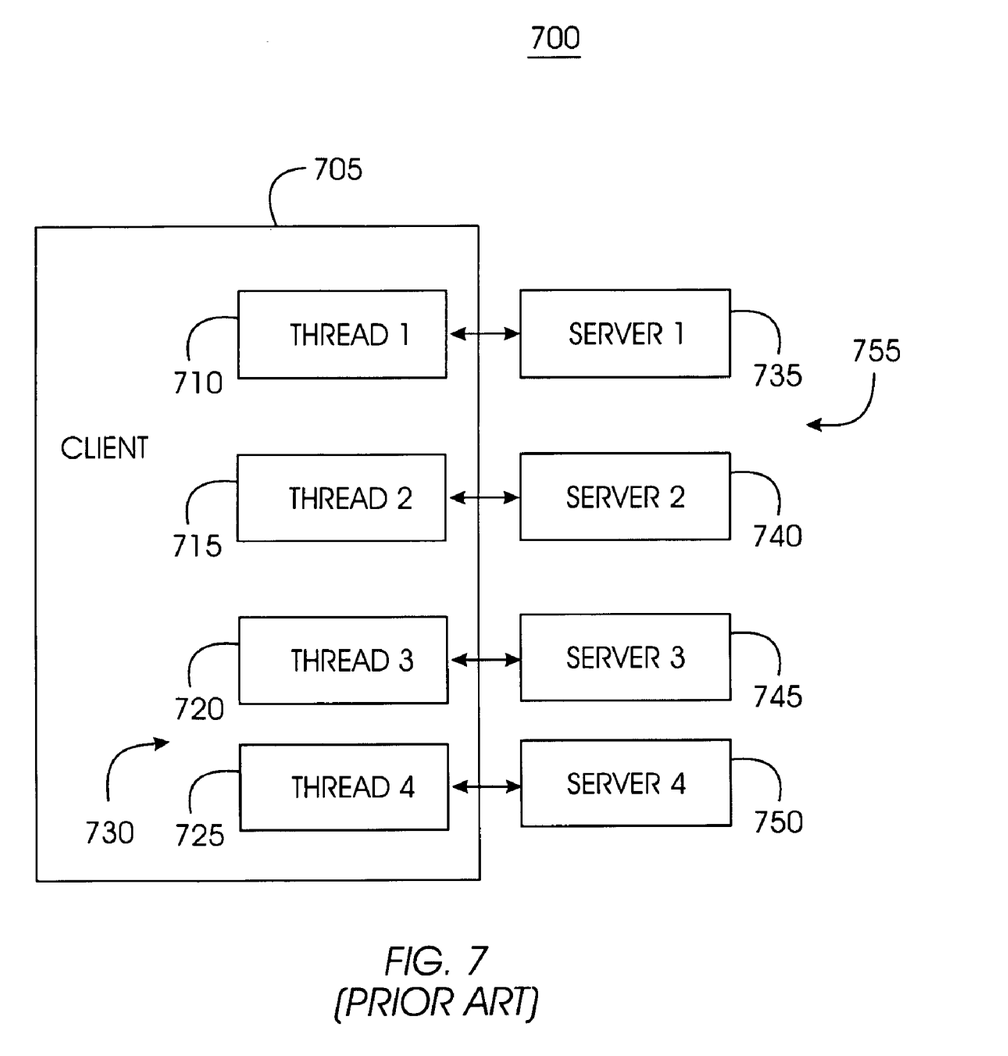
FIG. 7 is a diagram illustrating a conventional method for parallel processing of a query result.

Another conventional approach for issuing queries and collecting results is a parallel processing approach 700, illustrated by FIG. 7. A client 705 comprises a thread 1, 710, a thread 2, 715, a thread 3, 720, and a thread 4, 725 (collectively referenced as threads 730). Client 705 issues in parallel a query to and receives results from server 1, 735, server 2, 740, server 3, 745, and server 4, 750 (collectively referenced as servers 755). The parallel processing approach 700 utilizes one of the threads 730 for each of the servers 755 to manage input/output communication with each of the servers 755. For example, thread 1, 710, is dedicated to input/output communication with server 1, 735. Thread 2, 715, is dedicated to input/output communication with server 2, 740, etc. Although this technology has proven to be useful, it would be desirable to present additional improvements.

The parallel processing approach 700 has the advantage of quickly processing the results. Utilizing one of the threads 730 for each of the servers 755 is efficient with respect to time, but not resources. Each of the threads 730 consumes a substantial amount of computing resources. Further, network packets are typically 1.5 Kbytes. If the result of the query is much larger than 1.5 Kbytes, each of the threads 730 become active when data is ready to be read, resulting in a large number of context switches. As the number of servers 755 increases, the parallel processing approach 700 becomes even less efficient.

With both the sequential processing approach 600 and the parallel processing approach 700, the client 605 and client 705 are required to wait until sufficient information is accumulated to provide results. Several useful techniques have been developed for managing the collection of results provided in structured formats from a large distributed computing system.

However, the use of semi-structure formats such as XML is proliferating on the Internet and on other networks that are based on a web service model, requiring new approaches for managing bulk XML querying and semi-structured results streams. Structured data informs the client in advance how much data to expect so that the client can know when all the information has arrived and then process the information. Semi-structured data simply arrives at the client as a byte stream. The client then has to interpret the byte stream as it arrives by parsing the byte stream. Consequently, it is difficult to use one thread to process parallel streams of semi-structured data.

What is therefore needed is a system, a computer program product, and an associated method for bulk processing of semi-structured results streams from many different resources. The need for such a solution has heretofore remained unsatisfied.

SUMMARY OF THE INVENTION

The present invention satisfies this need, and presents a system, a computer program product, and an associated method (collectively referred to herein as "the system" or "the present system") for bulk processing of semi-structured results streams from many different resources such as, for example, databases, servers, and the like. The semi-structured results streams are referenced herein as results; results comprise many packets of information.

The present system can ingest an arbitrary number of bytes, parse as many bytes as practical, and return. Unlike conventional approaches, the present system processes packets as they arrive from a resource, creating intermediate results. The intermediate results are held in a register or stack until sufficient information is accumulated. The present system then merges the intermediate results to form a document model.

As network packets at one connection are consumed by the present system, the present system can select another connection at which packets are waiting for processing. The processing of results at a connection can be interrupted while the present system processes the results at another connection. In this manner, the present system is able to utilize one thread to process many incoming results in parallel. Because the present system functions much faster than the results arrive, the present system is able to provide the document model in a time frame comparable to that of a conventional system that utilizes dedicated threads for each of the incoming results. If data arrives more quickly, this can be easily addressed by using a small number of threads to handle the various connections.

The present system utilizes a pushdown deterministic automata and a finite state model. Because the incoming results are streaming, the present system requires very little state for each parse of the incoming results. Consequently, the present system is able to use a single thread to select from a bank of connections and transmit a query to each of the selected connections. The present system then waits for results to the query, parsing data from the results as it becomes available.

Instead of utilizing a multi-threaded parallel model as in conventional approaches, the present system utilizes a single thread that queries a network of resources in parallel. The query is typically small (on the order of 1 or 2 Kbytes or less). The results of the query are typically very large, hundreds of Kbytes or larger. The present system issues the query sequentially and receives the results from the resources in parallel. To process the results, the present system utilizes a single result thread that maintains state for each one of the resources that the present system has queried.

In one embodiment, system 10 may be used to process XML utilizing stream-based processors. Rather than generating a document model, the stream-based processor generates callbacks. One common callback interface is SAX (simple API for XML). In this embodiment, system 10 generates the appropriate SAX callbacks and SAX events from the XML streams. Users that base their event application programming interfaces (APIs) on SAX events can utilize system 10 to generate those SAX events with one thread rather than many threads in parallel. Further, system 10 can process the XML stream incrementally, providing a faster access to the SAX events by the event API.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

API: (Application Program Interface) A language and message format used by an application program to communicate with the operating system or some other system or control program such as a database management system (DBMS) or communications protocol. APIs are implemented by writing function calls in the program, which provide the linkage to the required subroutine for execution. Thus, an API implies that some program module is available in the computer to perform the operation or that it must be linked into the existing program to perform the tasks.

Automata: A machine, system, or subsystem that follows a preset sequence of instructions automatically.

Document Model: A representation of semi-structured data such as an XML data that a program can examine and query.

Internet: A collection of interconnected public and private computer networks that are linked together with routers by a set of standards protocols to form a global, distributed network.

Pushdown Deterministic Automata (PDA): a simple machine, system, or subsystem that manages a stack.

SAX (Simple API for XML): an event-based API that allows programming access to the contents of an XML document.

Semi-structured: Data, such as XML, that has a more loosely defined format than traditional columnar databases.

XML: extensible Markup Language. A standard, semi-structured language used for Web documents. During a document authoring stage, XML "tags" are embedded within the informational content of the document. When the web server subsequently transmits the web document (or "XML document") to a web browser, the tags are interpreted by the browser and used to parse and display the document. In addition to specifying how the web browser is to display the document, XML tags can be used to create hyperlinks to other web documents.

Xtalk: a binary encoding of XML. Used in high speed XML-RPC systems to reduce the complexity and computational load of the serialization/deserialization step without constraining the format of the query/response.

World Wide Web (WWW, also Web): An Internet client—server hypertext distributed information retrieval system.

Figure 1:
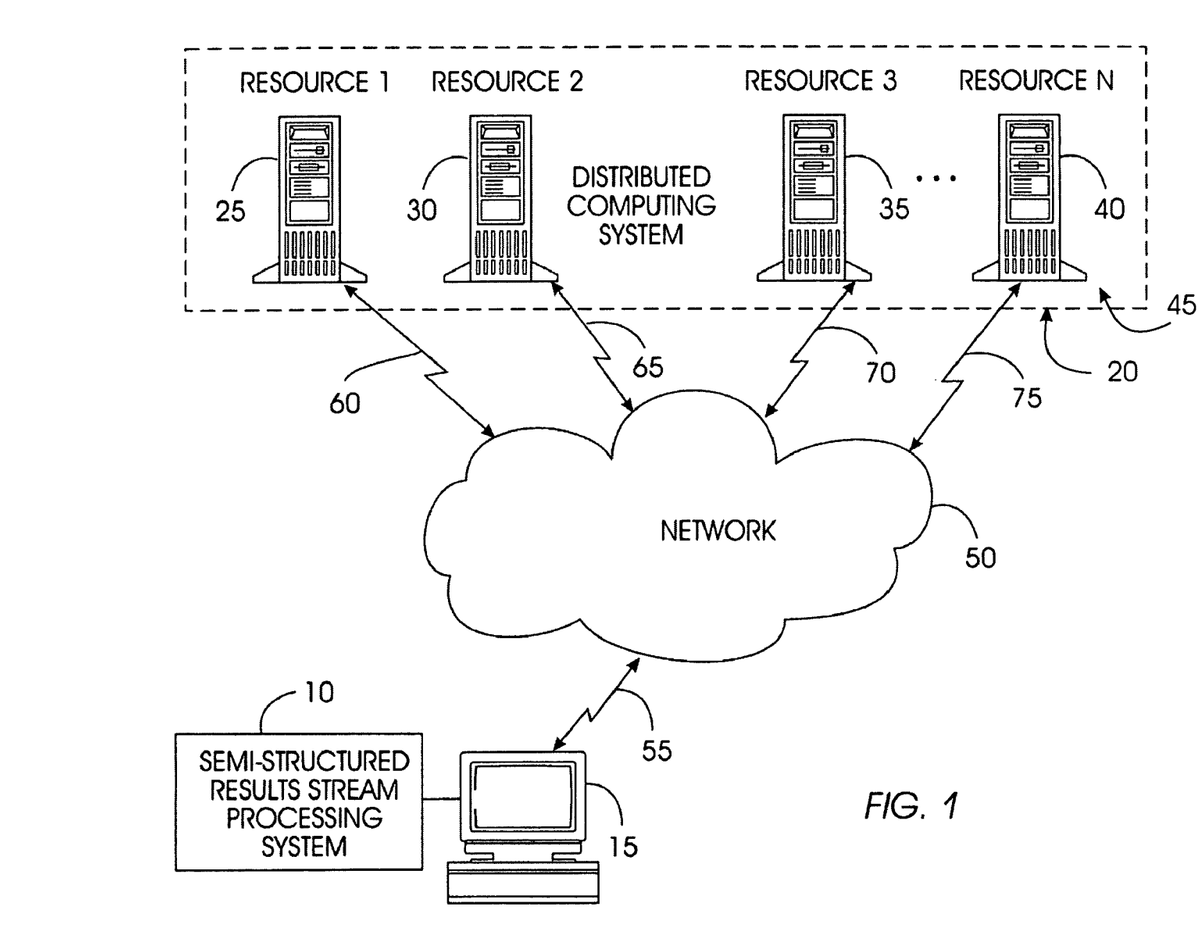
FIG. 1 is a schematic illustration of an exemplary operating environment in which a semi-structured results stream processing system of the present invention can be used.

FIG. 1 portrays an exemplary overall environment in which a system and associated method for bulk processing of semi-structured results streams from many different resources according to the present invention may be used. System 10 comprises a software programming code or a computer program product that is typically embedded within, or installed on a client 15. Client 15 may comprise a computer, a workstation, a server, or like devices. Alternatively, system 10 can be saved on a suitable storage medium such as a diskette, a CD, a hard drive, or like devices.

A distributed computing system 20 comprises computing resources such as a resource 1, 25, a resource 2, 30, a resource 3, 35, through a resource N, 40 (collectively referenced herein as resources 45). Client 15 can access the distributed computing system 20 through a network 50. Client 15 is connected to network 50 via a communications link 55 such as a telephone, cable, or satellite link. Resource 1, 25, resource 2, 30, resource 3, 35, through resource N, 40 can be connected to network 50 via communications link 60, 65, 70, 75 respectively. While system 10 is described in terms of network 50, client 15 may also access resources 45 locally rather than remotely.

Figure 2:
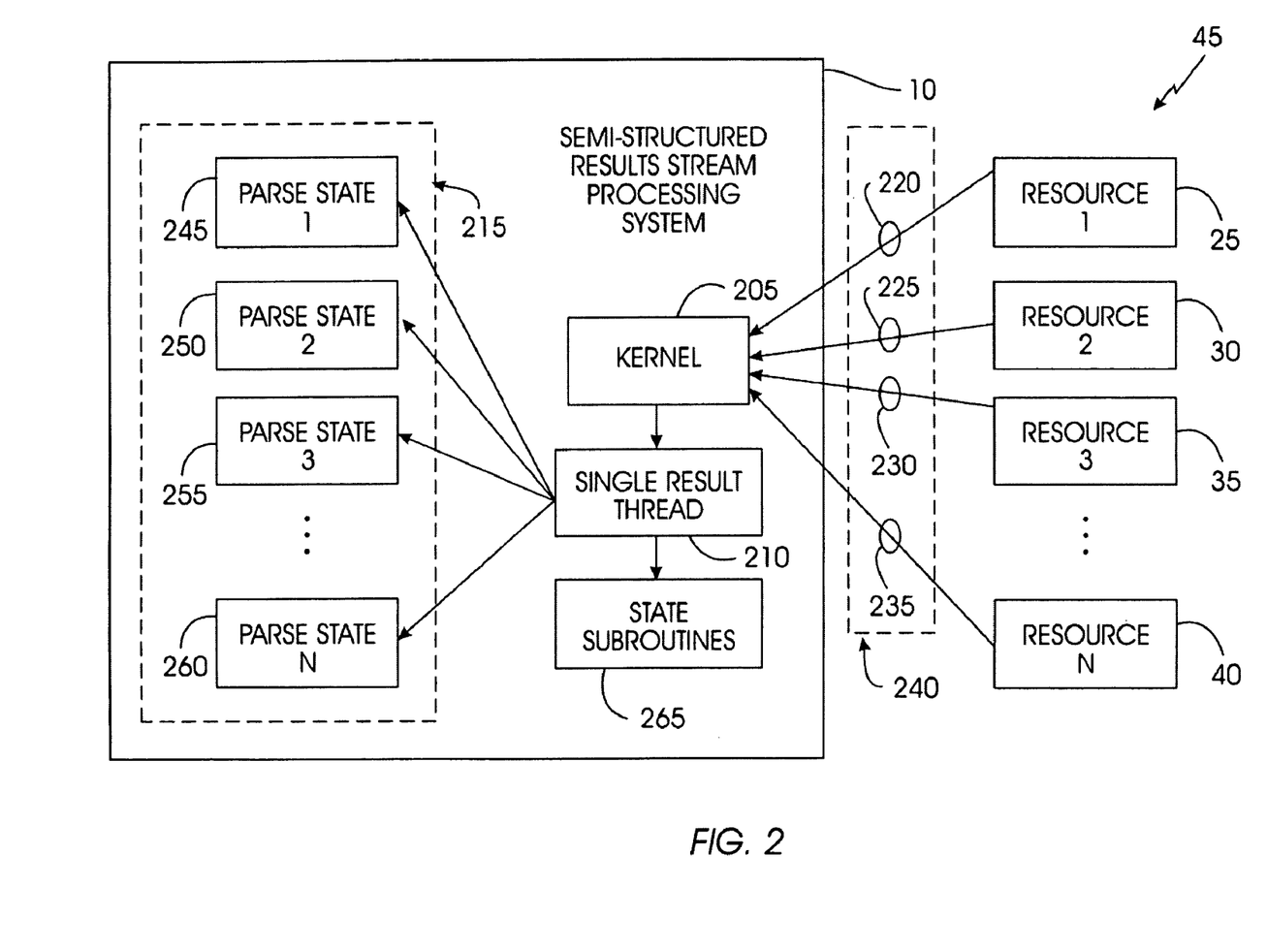
FIG. 2 is a block diagram of the high-level architecture of the semi-structured results stream processing system of FIG. 1.

FIG. 2 illustrates a high-level hierarchy of system 10. System 10 comprises a kernel 205. Kernel 205 is a kernel file descriptor set for select, as is commonly known in the art. Kernel 205 provides an interface to an operating system of client 15.

System 10 further comprises a single result thread 210. The single result thread 210 manages the operation of system 10, retrieves results (semi-structured results streams) from resources 45, and processes the results in conjunction with parse states 215. Communications from resource 1, 25, resource 2, 30, resource 3, 35, through resource N, 40, to system 10 occur via a connection 1, 220, a connection 2, 225, a connection 3, 230, through a connection N, 235 (collectively referenced as connections 240), respectively. It should be clear that the result thread 210 represents a single thread or a small number of threads.

Parse states 215 comprises a parse state for each of the resources 45 with which client 15 is communicating. Parse states 215 comprise a parse state 1, 245, a parse state 2, 250, a parse state 3, 255, through a parse state N, 260. In the example of FIG. 2, system 10 uses parse state 1, 245, to process information received from resource 1, 25, parse state 2, 250, to process information received from resource 2, 30, etc.

System 10 comprises state subroutines 265. State subroutines 265 are called by the single result thread 210 to process results received from resources 45 as the results arrive. The specific subroutine in state subroutines 265 called by the single result thread 210 depends on a state of the results. The single result thread 210 retrieves results from each of the connections 240 much faster than the results can arrive. Consequently, system 10 is able to process the results as they arrive, rather than waiting for all the results to arrive before processing the results and creating a document model.

Figure 3:
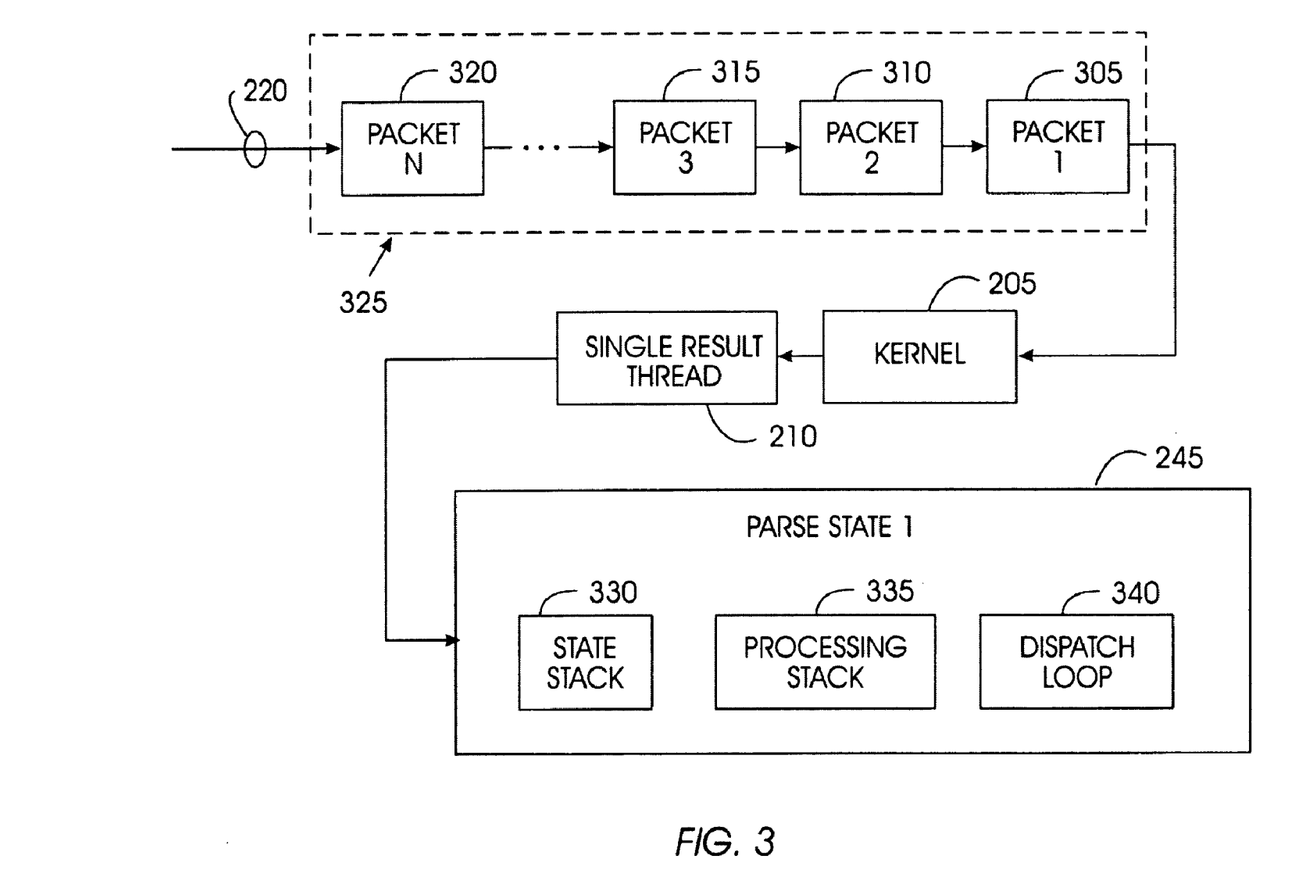
FIG. 3 is a block diagram of the high-level architecture of a parse state of the semi-structured results stream processing system of FIGS. 1 and 2.

FIG. 3 illustrates a high level hierarchy of an exemplary parse state, parse state 1, 245, and a corresponding connection 1, 220, with results shown as packet 1, 305, packet 2, 310, packet 3, 315, through packet N, 320 (collectively referenced as packets 325). Parse state 1, 245, comprises a state stack 330, a processing stack 335, and a dispatch loop 340. The state stack 330 is a stack or register for storing a state associated with packet 305. There is no limit to the number of states that can be placed in the state stack 330. The state associated with packet 305 provides to the single result thread 210 all the information required to properly process packet 305. The single result thread 210 uses the parse state 1, 245, to perform work on each of the packets 325, converting packets 325 received from one of the resources 45 into a document model.

In one embodiment, the processing stack 335 comprises a string stack, an integer stack, and a frame stack. The processing stack 335 temporarily stores intermediate data, i.e., data that has been processed but is not yet ready to be combined into a document model. For example, as system 10 pulls a string off connector 310, the string is stored in the string stack until it is processed. The frame stack holds the intermediate results, i.e., partially completed results. A state encountered toward the end of processing of the results from one of the resources 45 consumes all the intermediate results stored in the frame stack to create the final result, i.e., a document model. The integer stack controls the processing stack 335 by saving the contents of the number of sub-elements remaining of the packet 305.

The parse state 1, 245, is a pushdown deterministic automata. The parse state 1, 245, is pushing the work required for processing packet 305 onto the state stack 330; whatever state is on top of the state stack 330 defines the work required by packet 305. As packet 305 is retrieved from connection 1, 220, by kernel 205, the single result thread 210 determines the state of packet 305, selects a corresponding subroutine from the state subroutines 265 that corresponds to the determined state of packet 305, and instructs the corresponding subroutine to process packet 305.

The results of processing packet 305 are stored in the string stack; the current state of packet 305 is stored in the state stack 330. As the single result thread 210 processes packet 305, any additional states representing future processing required by packet 305 are "queued" by pushing the additional states onto the state stack 330. As each corresponding subroutine from the state subroutines 265 is completed, the single result thread 210 examines the state stack 330 to determine if any additional processing remains for packet 305. If so, the single result thread 210 pops the top state off the state stack 330 (removes the top state from the state stack 330), performs the corresponding subroutine from the state subroutines 265, and discards the top state.

In addition to popping the top state in the state stack 330, the corresponding subroutine in the state subroutines 265 may remove additional states from the state stack 330 or add states to the state stack 330, depending on the processing performed on packet 305. A specific state may appear many times in the state stack 330. Any of the state subroutines 265 may be performed any number of times, as required, to transform packets 325 into a document model.

The single result thread 210 continues processing packet 305 until the state stack 330 is empty. System 10 then retrieves packet 2, 310, packet 3, 315, through packet N, 320, until all packets 325 have been processed in like fashion. Packets 325 represent a portion of the results returned by one of the resources 45. When no packets 325 are found at connection 1, 220, system 10 proceeds to any other of the connections 240 that have packets such as packet 305 waiting for processing. In this manner, system 10 utilizes the single result thread 210 to process results that arrive at client 15 in parallel.

Figure 4A:
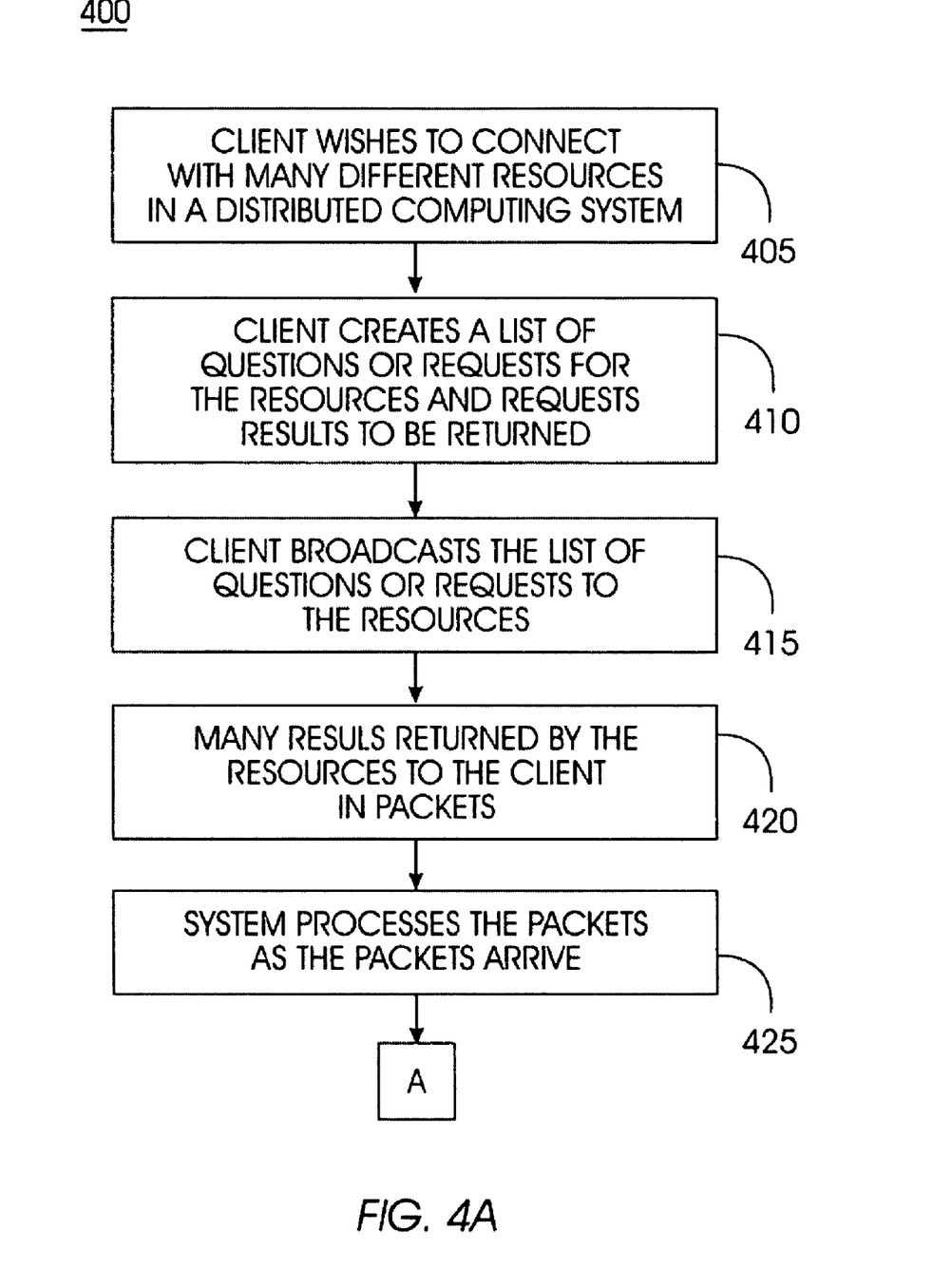
FIG. 4 is comprised of FIGS. 4A and 4B, and represents a process flow chart illustrating a method of operation of the semi-structured results stream processing system of FIG. 1.
Figure 4B:
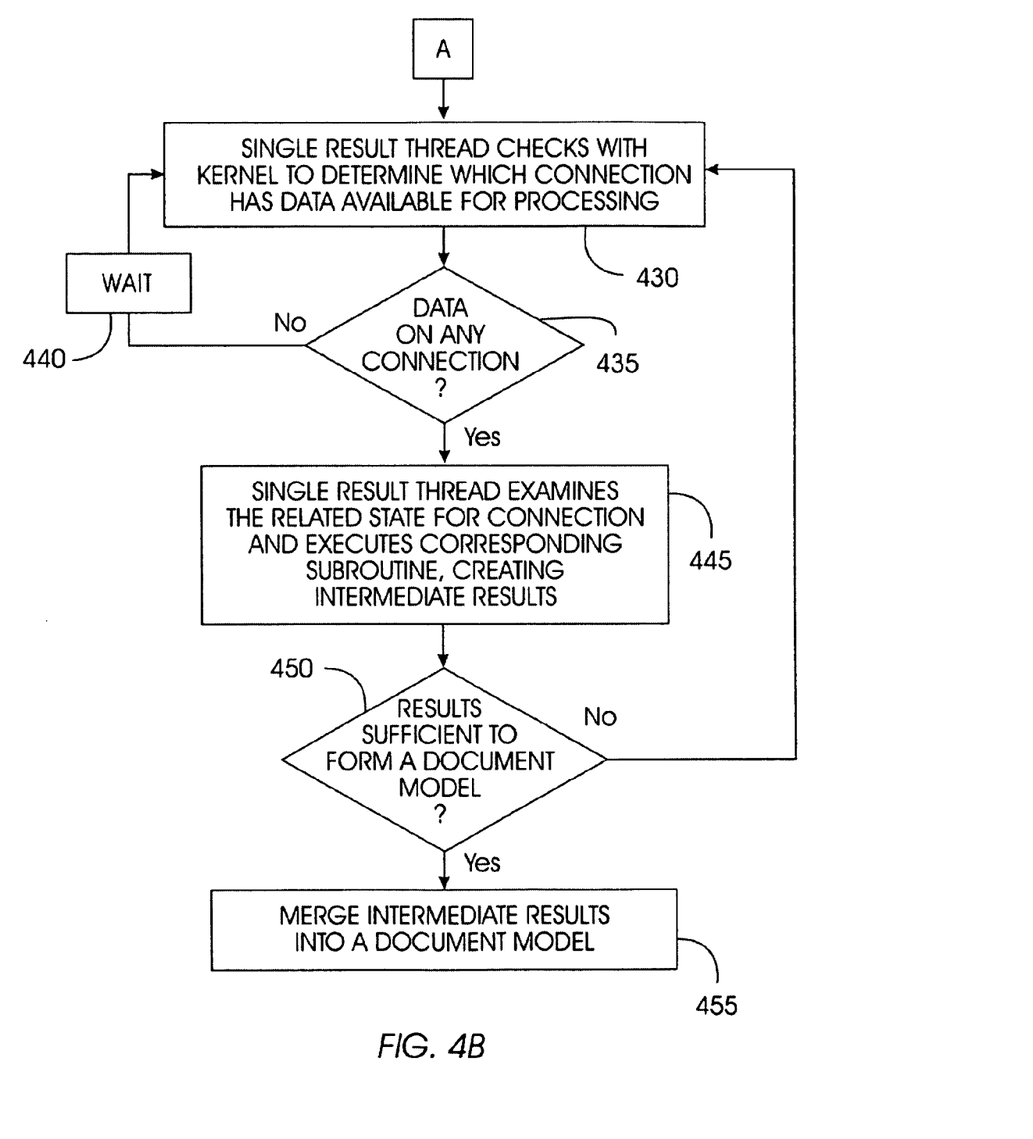

FIG. 4 (FIGS. 4A, 4B) illustrates a method 400 of operation of system 10. Client 15 wishes to connect with many different resources and databases such as, for example, resources 45 in the distributed computing system 20 (step 405). Client 15 creates a list of questions or requests for resources 45 and requests the return of results from resources 45 (step 410). Client 15 broadcasts the list of questions or requests to resources 45 (step 415). The list of questions or requests to resources 45 may be broadcast, for example, sequentially, in parallel, or by any other method that transmits the query or request to resources 45. Resources 45 return many results to the client 15 in packets such as packets 325 (step 420). Some of the resources 45 in the distributed computing system 20 may not return results if they do not have results that match the query or request.

Results from resources 45 are returned to client 15 in pieces; each piece is a packet such as packet 305. Typically, packets such as packet 305 are approximately 1.5 Kbytes on a typical Ethernet. In one embodiment, the results from resources 45 are returned as a stream of bytes encoded in XML. In another embodiment, the results from resources 45 are returned in a stream of bytes encoded in binary encoding such as Xtalk. The method 400 of system 10 converts the stream of bytes into a document model.

System 10 processes each of the packets 325 as packets 325 arrive at client 15 (step 425) by executing the pseudo code below, which is provided for example purpose only. The single result thread 210 checks with kernel 205 to determine which of the connections 240 have data available for processing (step 430) using a "select" method as is currently available and known in the art. If no packets are on any of the connections 240 (decision step 435), system 10 waits at step 440 for packets arrive at any of the connections 240. If a packet such as packet 305 is found at any of the connections 240 (decision step 435) such as, for example, connection 1, 220, the single result thread 210 utilizes the dispatch loop 340 to performs a dispatch loop procedure. The dispatch loop procedure examines the related state for the packet and executes the corresponding subroutine of the state subroutines 265, creating intermediate results (step 445).

If accumulated intermediate results are not sufficient to form a document model (decision step 450), system 10 returns to step 430 and continues processing packets 325. Otherwise, a document model can be formed and system 10 then merges the intermediate results into a document model (step 455). Method 400 is performed recursively, continually converting into document models semi-structured results that are transmitted in parallel to client 15.

Figure 5:
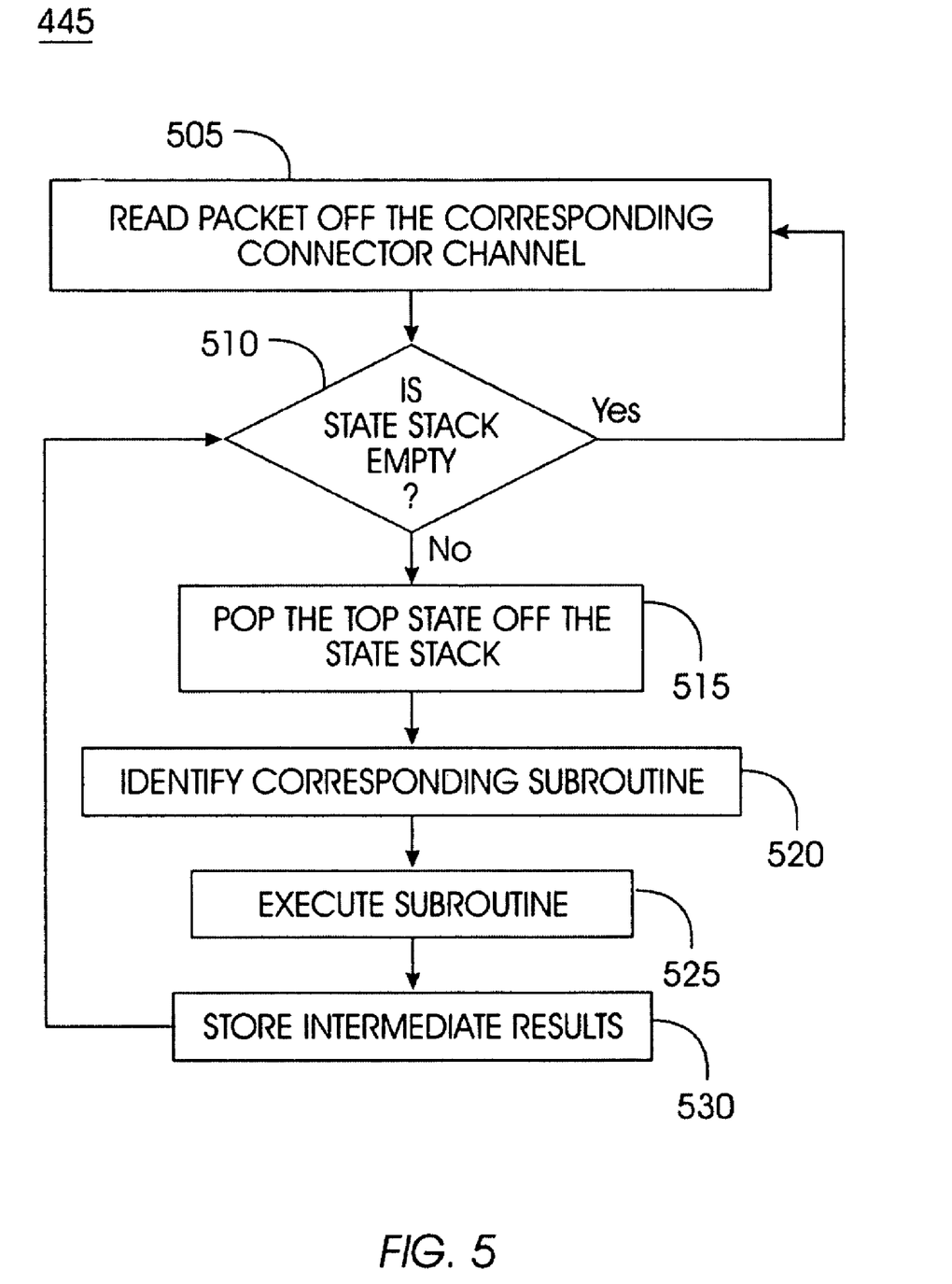
FIG. 5 is a process flow chart illustrating a method of operation of the semi-structured results stream processing system of FIGS. 1 and 2 in processing packets of information.

FIG. 5 illustrates the dispatch loop procedure (step 445) in more detail. In step 445, system 10 processes packets 325, forms intermediate results, and merges the intermediate results in an interleaved fashion to create a document model. At step 505, the dispatch loop 340 reads packet 305 off the corresponding connection 1, 220. At decision step 510, the dispatch loop 340 determines if the state stack 330 is empty. If yes, no processing is required for packet 305 and the dispatch loop returns to step 505. If the state stack 330 is not empty at decision step 510, the dispatch loop pops the top state off the state stack 330 (step 515). The dispatch loop 340 then identifies for the popped state a corresponding subroutine from the state subroutines 265 (step 520). The dispatch loop then executes the corresponding subroutine (step 525) and stores the intermediate results in the frame stack (step 530).

System 10 repeats steps 505 through 530 recursively until all packets 325 at connections 240 have been processed. System 10 processes packets 325 faster than packets 325 arrive at client 15, allowing one thread, the single result thread 210, to handle many parallel streams of results. Results are returned to client 15 from resources 45 in a random fashion. Each of the resources 45 simply sends results to client 15 when the results are available and not in any particular order. The single result thread 210 jumps from connection to connection, processing packets as they arrive and merging intermediate results at each of the connections 240 until all the packets from resources 45 are retrieved, processed, and formatted as a document model.

In the illustrative pseudo code below, there are shown seventeen states or subprograms that are selectively executed by system 10. The following are four exemplary stacks that are used in a preferred embodiment of the present invention; it being understood that other stacks could be used:
    the state stack
    the integer stack
    the frame stack
    the string stack parse begins with the INIT state

```
INIT:
    make sure there are 2 bytes
    consume them
    check if the first is 'X'
    push PINIT
PINIT:
    make sure there are 4 bytes
    these are the # of processing instructions
    push PI this number of times
PI:
    make sure there is 1 byte
    if it is a p get rid of the processing instruction by
        push DROPSTRING
        push GETSTRING
    if it is an E this is the element we want so
        push MAKERETURN
        push GETFRAME
    else CORRUPT
DROPSTRING:
    pop the top element off the string stack
GETSTRING:
    make sure we have 4 bytes
    this is the size of the string
    allocate it and set the position pointer to 0
    push GS1
GS1:
    need at least 1 byte
    do we have enough bytes to finish the string?
    if so,
        finish the string (copying it into the string buffer)
        set the pointer forward that many bytes
    else
        take as much as we can (copying it into the string buffer)
        set the pointer forward that many bytes
        push GS1
GETFRAME:
    We need the key, then to go on w/ the frame, so
    push F1
    push PUSHSTRING
    push GETSTRING
PUSHSTRING:
    take the string out of the string buffer and push it on the string stack
F1:
    make sure we have 4 bytes
    this is the number of attributes
    we need to get them, then go on with the frame
    each attribute has a key and value, so
    push F2
    pushint count (this pushes to the int stack)
    and then for each attributes
        push PUSHSTRING
        push GETSTRING
        push PUSHSTRING
        push GETSTRING
F2:
    make sure we have 4 bytes
    this is the number of children
    pushint count
    pushint F3
F3:
    we need 1 byte
    this is the type of the child
    get the number of children by popint
    if it is 's' then this whole frame is a leaf
        push MAKELEAF
        push PUSHSTRING
        push GETSTRING
    else, it is an 'E' and there are subframes
        pushint count
        push MAKENODE
        push PUSHFRAME
        push GETFRAME
        for each child
            push EATE
            push PUSHFRAME
            push GETFRAME
MAKELEAF:
    gather the value of the leaf (via popstring)
    the number of attributes (via popint)
    all of those attributes (via multiple popstring)
    the key (via popstring)
    create a leaf and assign it to the frame buffer
PUSHFRAME:
    take the value of the frame buffer and push it on the frame stack
EATE:
    make sure we have at least one byte, then check that is an 'E'
```

-continued

```
and
    consume it
MAKENODE:
    gather the number of children (via popint)
    the number of attributes (via popint)
    the children (via multiple popframe)
    the attributes (via multiple popstring)
    the key (via popstring)
    create a node and assign it to the frame buffer
MAKERETURN:
    take the value of the frame buffer, move it to the return
    value and exit the parse
```

It is to be understood that the specific embodiments of the invention that have been described are merely illustrative of certain applications of the principle of the present invention. Numerous modifications may be made to a system and method for bulk processing of semi-structured results streams from many different resources described herein without departing from the spirit and scope of the present invention. Moreover, while the present invention is described for illustration purpose only in relation to XML web services, the present invention may be applied to any network in which computers are interconnected and can communicate with one another. The present system can further be applied to one computer with many databases. Further, the application of the present invention toward query results or requests is presented for illustration purposes only. The present invention may be applied to any parallel processing of semi-structured streams of data.

What is claimed is:

1. A method in a computer for bulk processing of semi-structured results streams from a plurality of different resources, comprising:
    sequentially polling a plurality of incoming connections for existence of data, each incoming connection associated with one of a plurality of different resources, wherein no incoming connection has priority over another incoming connection;
    using a single thread to inquire if data is available on any of the plurality of incoming connections, wherein the single thread maintains a parse state for each one of the plurality of different resources that are queried;
    receiving data on at least two of the plurality of incoming connections;
    processing at least some of the data available on one incoming connection of the at least two incoming connections by parsing data on the one incoming connection using a pushdown deterministic automata and a finite state model that allow continual processing of semi-structured results streams from a plurality of different resources using the single thread and by parsing data on another incoming connection of the at least two incoming connections if not enough data exists to continue the parsing on the one incoming connection; and
    iteratively processing data on other ones of the at least two incoming connections when polling reveals data exists on the other ones of the at least two incoming connections, until all incoming connections have responded and results from all incoming connections are fully parsed, wherein the single thread invokes a dispatch loop procedure for the at least two incoming connections on which the data is found to exist, and wherein the single thread further executes the dispatch loop procedure on the data in an interleaved fashion, for bulk processing the semi-structured results streams from a plurality of different resources.

2. The method of claim 1, wherein the different resources return the semi-structured results in response to a query.

3. The method of claim 1, wherein the different resources comprises a plurality of data stores.

4. The method of claim 1, wherein the different resources reside on a plurality of computers.

5. The method of claim 1, wherein the parse state comprises a state stack for storing a state associated with the data.

6. The method of claim 1, wherein the parse state comprises a processing stack for storing intermediate results.

7. The method of claim 2, further comprising a client computer broadcasting the query to different resources to obtain final results.

8. The method of claim 1, further comprising determining the state associated with the data for processing the data.

9. The method of claim 8, further comprising identifying a subroutine associated with the data, the subroutine utilized by the dispatch loop to process the data.

10. The method of claim 9, further comprising executing a subroutine corresponding to the parse state to create a plurality of intermediate results.

11. The method of claim 10, further comprising storing the intermediate results until a document model may be formed from the intermediate results.

12. The method of claim 11, further comprising merging the intermediate results into a document model for use by a client.

13. The method of claim 11, further comprising merging the intermediate results into a plurality of callbacks for use by event application programming interfaces.

14. The method of claim 11, further comprising storing the intermediate results until an event is generated from information that is local to a given state.

15. A computing system for bulk processing of semi-structured results streams from a plurality of different resources, comprising:
    a plurality of incoming parallel connections from a plurality of different resources, wherein no incoming parallel connection has priority over another incoming parallel connection;
    a single thread that inquires if data is available on any of the plurality of incoming parallel connections from the plurality of different resources and retrieves results from at least one of the plurality of resources;
    a parse state for each of the plurality of resources, wherein each parse state processes data received from only one of the incoming parallel connections in conjunction with the single thread, and wherein each parse state comprises a dispatch loop;
    wherein the single thread invokes the dispatch loop for one of the incoming connections on which data is found to exist;
    wherein the single thread further executes the dispatch loop on the data in an interleaved fashion to serially parse the data on each of the plurality of incoming parallel connections, for bulk processing semi-structured results streams from the plurality of different resources; and
    wherein each parse state processes at least some of the data available on one of the incoming parallel connections using a pushdown deterministic automata and a finite state model, wherein the pushdown deterministic automata and a finite state model allow processing of the semi-structured results streams on another of the incoming parallel connections when not enough data exists to continue a parse on the one incoming parallel connection.

16. The system of claim 15, wherein the plurality of different resources returns the semi-structured results in response to a query.

17. The system of claim 15, wherein the plurality of different resources comprises a plurality of data stores.

18. The system of claim 15, wherein the plurality of different resources resides on a plurality of different computers.

19. The system of claim 15, wherein the parse state comprises a state stack for storing a state associated with the data.

20. The system of claim 15, wherein the parse state comprises a processing stack for storing intermediate results.

21. The system of claim 16, further comprising a client computer that broadcasts the query to different resources to obtain final results.

22. The system of claim 19, further comprising a subroutine corresponding to the parse state that is executed to create a plurality of intermediate results, wherein, as each subroutine is completed, the single thread examines the state stack to determine if any additional processing remains for the data, and if any additional processing remains, the single thread removes the top state from the state stack, performs a corresponding subroutine, and discards the top state.

23. A computer readable storage medium having a set of instruction codes for bulk processing of semi-structured results streams from a plurality of different resources, comprising:
 a first set of instruction codes that sequentially polls a plurality of incoming connections from a plurality of different resources for existence of data, wherein no incoming connection has priority over another incoming connection;
 a second set of instruction codes that inquires if data is available on any of the plurality of incoming connections from the plurality of different resources, and that selects one incoming connection from the plurality of connection;
 a third set of instruction codes that accesses a stream of bytes in a semi-structured format on the one selected incoming connection;
 a fourth set of instruction codes that processes at least some of the data available on the one selected incoming connection, wherein the fourth set of instruction codes comprises a dispatch loop;
 wherein the second set of instruction codes invokes the dispatch loop for the one selected incoming connection;
 wherein the second set of instruction codes further executes the dispatch loop on the stream of bytes in an interleaved fashion, for bulk processing semi-structured results streams from the plurality of different resources; and
 wherein a single thread processes the data using a pushdown deterministic automata and a finite state model that allow bulk processing of semi-structured results streams on another incoming connection on which data is available if not enough data exists to continue a parse of semi-structured results streams on the one incoming connection.

24. The computer readable medium of claim 23, wherein the plurality of different resources returns the semi-structured results in response to a query.

25. The computer readable medium of claim 23, wherein the plurality of different resources comprises a plurality of data stores.

26. The computer readable medium of claim 23, wherein the plurality of different resources resides on a plurality of different computers.

27. The computer readable medium of claim 23, wherein the second set of instruction codes comprises a state stack for storing a state associated with the data.

28. The computer readable medium of claim 23, wherein the second set of instruction codes comprises a processing stack for storing intermediate results.

29. The computer readable medium of claim 24, further comprising a client computer that broadcasts the query to different resources to obtain final results.

30. The computer readable medium of claim 23, further comprising a third set of instruction codes that is executed to create a plurality of intermediate results.

31. The method of claim 1, including accessing a stream of bytes encoded in Extensible Markup Language (XML) on the one of the incoming connections.

32. The method of claim 1, including accessing a stream of bytes encoded in binary encoding on the one of the incoming connections.

33. The system of claim 20, wherein the processing stack includes a string stack, a integer stack and a frame stack, and wherein the results of processing a packet of semi-structured results are stored in the string stack, and wherein, as the single thread processes the packet, any additional states representing future processing required by the packet are queued by pushing the additional states onto the state stack.

* * * * *